Feb. 4, 1958  F. HERZEGH  2,822,017
TUBELESS TIRE AND DIVIDED RIM ASSEMBLIES
Filed Aug. 2, 1954  2 Sheets-Sheet 1
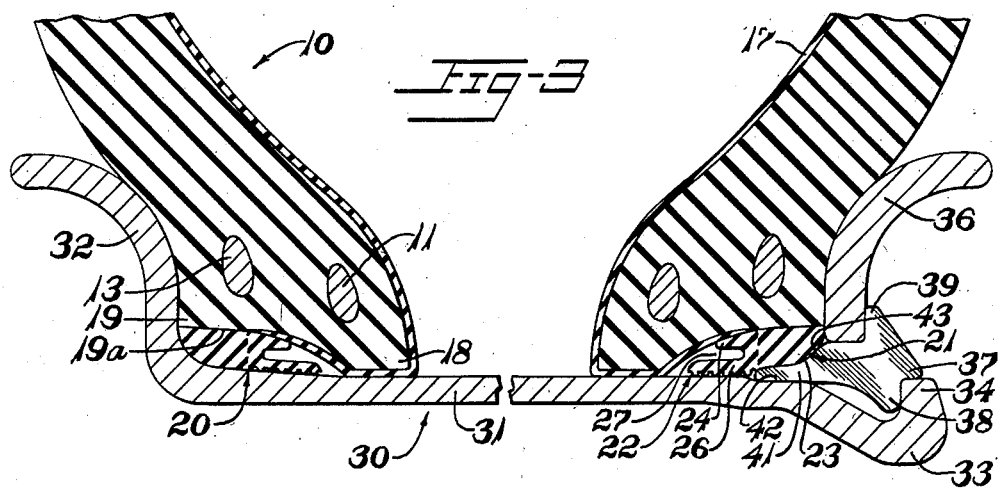
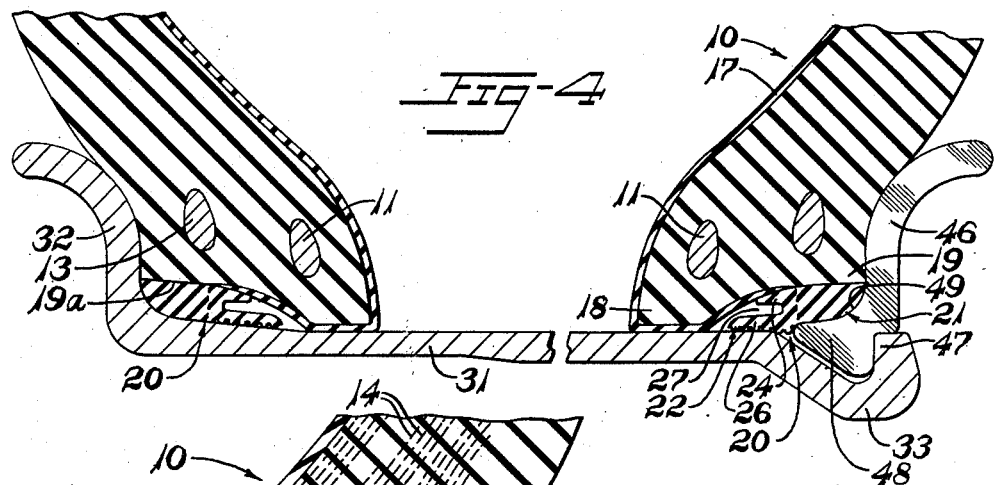
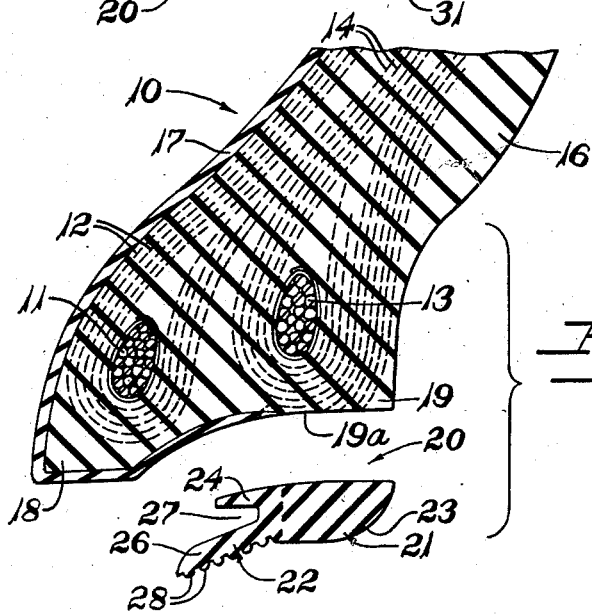
INVENTOR.
FRANK HERZEGH
BY C. E. Tripp
ATTY.

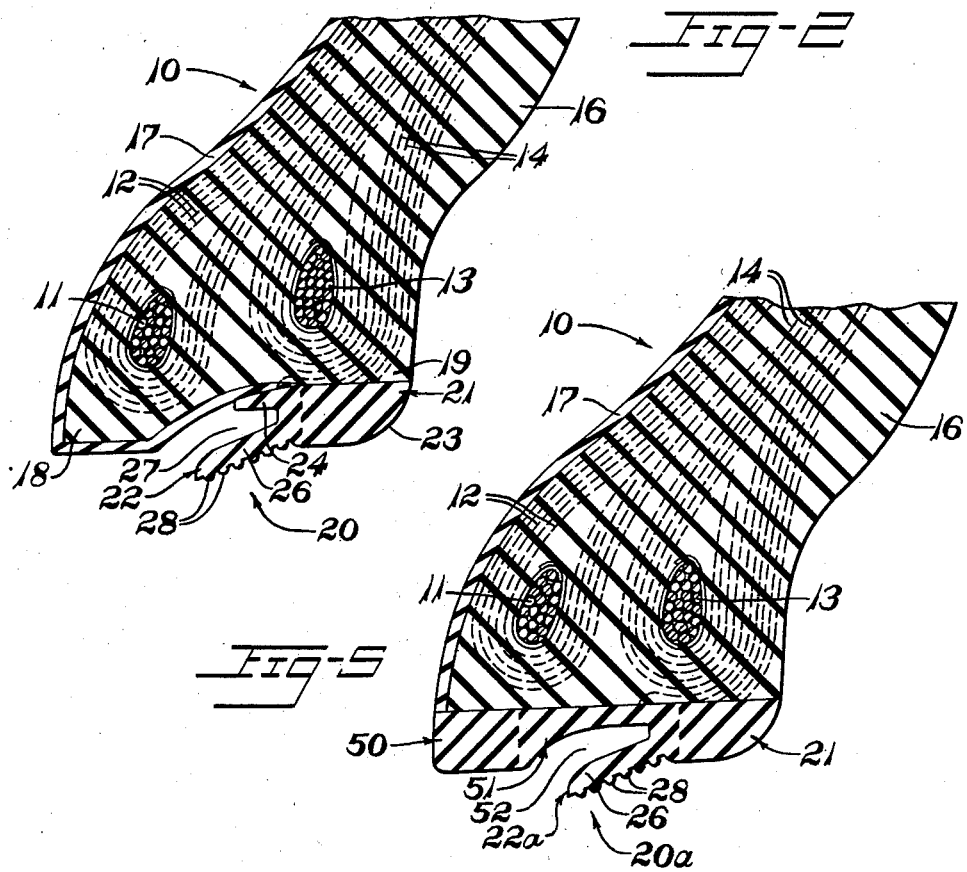
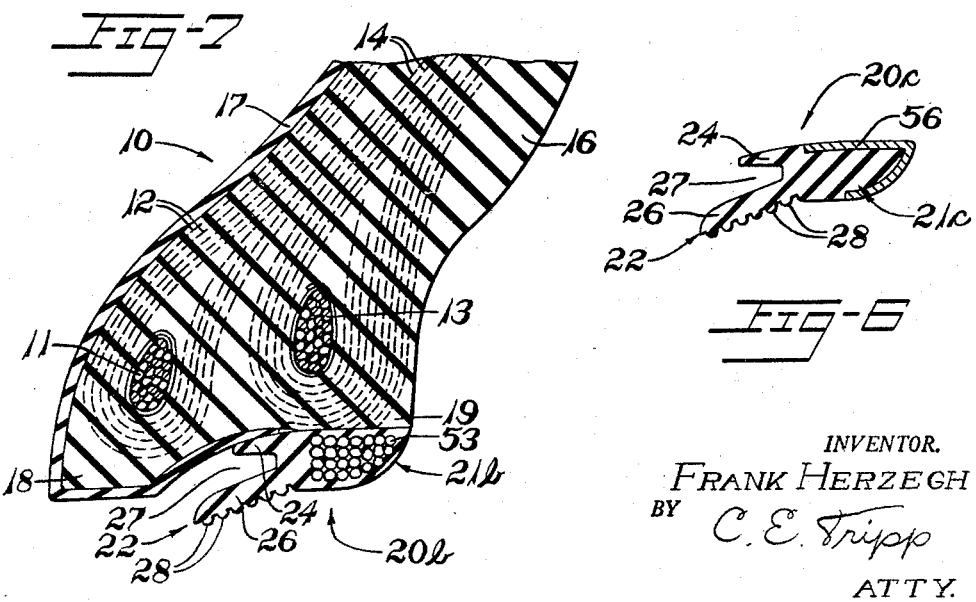

United States Patent Office 2,822,017
Patented Feb. 4, 1958

2,822,017

TUBELESS TIRE AND DIVIDED RIM ASSEMBLIES

Frank Herzegh, Cleveland, Ohio, assignor to The B. F. Goodrich Company, New York, N. Y., a corporation of New York Application August 2, 1954, Serial No. 447,316

14 Claims. (Cl. 152—362)

This invention relates to tubeless pneumatic tire and circumferentially divided rim assemblies, most commonly being of the heavy duty type such as are employed for truck, bus, and earth mover services.

The type of rim to which this invention relates is one wherein the rim includes a major circumferentially continuous "base" section having a tire retaining flange at one side and one or more detachable ring-like sections fitted to one side of the base section and serving to provide for mounting, retaining, and demounting the tire. At least one of the detachable sections or rings is split transversely to facilitate assembly.

The rim base section is circumferentially solid and except for the valve stem opening presents no air leakage problem when mounting a tubless tire. The detachable sections, however, may be split or continuous but in either case, there is at least one circumferential joint present between the detachable and base sections that is not airtight. Air from within the tire must not be allowed to leak through this joint.

Furthermore, the rim designs of important rim makers vary in several respects and each design presents a somewhat different sealing problem. A premise of this invention is that the design of the rims themselves need not be altered for mounting tubeless tires. The more important features of this invention are listed below:

Current rims usable with this invention need not be altered during changeover from tube-type tires to tubeless tires, and vice-versa. Suitable means for sealing the valve stem slot are disclosed in my co-pending application, Serial No. 391,225, filed November 10, 1953, now Patent No. 2,798,529, July 9, 1957.

The vehicle service man or operator need not handle any additional or auxiliary rim parts to seal the circumferential joint between the rim base section and the detachable tire retaining means.

The tire can be mounted and demounted without replacement or renewal of parts.

The tubeless tire of this invention can be run with an inner tube if so desired without modification of the tire or rim other than removing the rim-mounted valve.

The cost is comparable to or less than the cost of making additions or changes to standard commercial rims, in order to permit the use of tubeless tires on such rims.

Tire life is unimpaired.

Briefly, these features are obtained by forming the tire bead so as to seal with the main rim base section around an area axially inside of the circumferential joint between the detachable flange and the base section. In a preferred form of the invention, an annular open groove or recess extends from the heel of the tire bead toward the bead toe in at least the bead adjacent the removable rim flange and the recess is fitted with an air-retaining and load-bearing ring structure having self-sealing flexible rubber lips, one lip sealing against the tire bead and the other lip closing off the annular joint between the rim parts, all while providing in the completed tire and rim assembly a structure that will perfectly perform both load bearing and air sealing functions.

The manner in which this invention may be practised by those skilled in the art will be apparent from the following description of a preferred and other embodiments of my invention.

In the drawings:

Fig. 1 shows a portion of one tire bead formed under the preferred embodiment of my invention bracketed with a section of a cured air-retaining and load-bearing member before it is mounted on the tire bead.

Fig. 2 is a fragmentary section showing the assembled tire bead portion and air-retaining member assembled together.

Fig. 3 shows the bead areas of a completed tire and rim assembly mounted on one type of circumferentially split rim. (Carcass details of the tire are omitted.)

Fig. 4 shows the same tire on a different type of rim.

Figs. 5–7 show one bead portion of other embodiments of my invention on tires suitable for mounting on either of the rims of Figs. 3 and 4.

Referring to the form of the invention shown in Figs. 1 to 3 since the carcass and tread of the tire may be of any suitable conventional construction and forms no part of the invention only the bead portions of the tire are shown. The preferred form of the invention is illustrated and described as applied to a heavy duty tire such as a truck or bus tire although it is understood that in its broader aspects the invention is not limited to this class of service. Fig. 1 shows one bead of a heavy duty tire formed in accordance with a preferred embodiment of my invention associated with air-retaining means before the two parts are joined for service. The tire 10 in the heavy duty form shown has an inner wrapped wire bead core 11 about which one set of cord plies 12 are turned up and a second bead core 13 of somewhat larger diameter than the bead core 11 anchors a second series of cord plies 14, the cord plies being of the usual bias-laid rubberized cord construction. The side wall rubber 16 merges in the usual manner with the tread cap (not shown) vulcanized with the carcass during curing of the tire. An inner liner 17 is formed of a material highly resistant to air diffusion such as butyl rubber or compounds thereof with natural rubber or neoprene and its compounds is bonded to the inside of the carcass during tire cure. The liner extends around the toe 18 of the tire bead and towards the heel portion 19 of the bead but may stop short of the bead heel because the presence of the air-retaining means makes it unnecessary that the liner cover the entire inner face of the bead. In the preferred form of the invention a shallow recess or groove 19a is provided by properly forming the tire mold at the bead region. Space accommodation for the outer cord plies 14 is assured by the fact that in this form of the invention the wire bead core 13 is of larger diameter than the bead core 11 disposed at the toe of the bead. By way of example, the radial depth of recess 19a may be in the order of 5/16 inch and the recess may be about 1¼ inch wide when molded in a 10 inch section 20 inch bead diameter tire.

The air-retaining member 20 is preferably molded and cured in a circumferentially split annular mold and comprises a load bearing portion 21 and a relatively flexible sealing portion 22 bonded to the load-bearing portion during the curing operation. The load-bearing portion 21, which is disposed at the heel part of the tire bead is rounded as at 23 to correspond with the rounded structure of the rim parts upon which it will be mounted. In the form described the load-bearing portion is formed of relatively stiff rubber, having a hardness on the Durometer scale of 85 to 95. A compound found suitable for this portion may be formed from the following recipe:

| | Parts by weight |
|---|---|
| Natural rubber | 100.0 |
| Fine clay | 72.0 |
| Hydrated lime | 13.5 |
| Magnesium oxide | 6.5 |
| Palm oil | 2.0 |
| Sulfur | 33.0 |
| | 127.0 |

Bonded to and extending axially inwardly from the load bearing portion is the sealing portion 22 which is of relatively flexible rubber stock and which has a hardness on the Durometer scale of 35 to 65. A compound found suitable for this service has a recipe as follows:

| | Parts by weight |
|---|---|
| Neoprene | 50.0 |
| Natural rubber | 50.0 |
| Total rubber | 100.0 |
| Carbon black | 25.0 |
| Zinc oxide | 5.0 |
| Magnesium oxide | 2.0 |
| Rosin | 1.0 |
| Sodium acetate | 1.0 |
| Stearic acid | 0.5 |
| Petroleum oil | 4.0 |
| Accelerator | 1.0 |
| Sulfur | 0.5 |
| | 40.0 |

In both of the above examples, part of the rubber and the sulfur may be separately pre-mixed to form a masterbatch containing the sulfur that is mixed with the other ingredients in accordance with usual practice.

It will be appreciated that although specific recipes for the load bearing and sealing portions of the air retaining members have been given these are intended only as examples and the invention is not limited to air retaining members formed from these specific compositions. Moreover, the invention is not limited to use of natural rubber or neoprene for the air retaining member since other elastomeric materials of rubber-like nature may be employed as will be readily understood by those skilled in the rubber compounding art. Hence, the term rubber as used hereinafter and in the subjoined claims is intended to be construed generically as including both natural and synthetic rubbers as well as other elastomeric compounds having rubber-like physical properties.

The structure of the air-sealing portion 22 in the preferred form of the invention is such that there are two axially extending but radially spaced lips 24 and 26 leaving an annular channel 27 for exposure to air under pressure. The lip 26 is molded with circumferential sealing ribs 28 which ribs increase the unit sealing force due to air pressure within the channel 27 and thereby insure a firm engagement for the rim.

Upon assembly, the air-sealing and load-bearing member 20 is cemented to the inner surface of recess 19a in the tire bead, using either a curing or a non-curing cement, or the sealing structure may be vulcanized to the tire bead when the tire is being cured or later. The advantage of the use of cement for mounting is that removal of the sealing means is more readily accomplished and the pre-molded divergence of the lip 26 from the opposite lip 24 is readily maintained up to the time of mounting the tire on the rim. It will be noted that the lip 24 overlaps the liner 17 to prevent air seepage into the carcass cords. The completed bead assembly is shown in Fig. 2 ready for mounting on the rim.

Fig. 3 shows the completed tire assembly mounted on one well-known type of heavy duty rim 30. The rim has a rim base section 31 which is either detachable or permanently fixed on the vehicle wheel and which is provided with a valve slot (not shown) with which a valve may be mounted as disclosed in my aforesaid copending application. The rim base 31 carries at its axially inner side a curved tire retaining flange 32 that assists in bearing radial loads and the other side of the rim section is formed with the usual gutter portion 33 terminating in a radial retaining lip 34. Rim section 31 is circumferentially continuous. In order to retain the outer tire bead in place on the rim, tire retaining means are provided including a curved continuous flange 36 and a split locking ring 37. The locking ring has a shoulder 38 for engaging the lip 34 of the rim base gutter and another shoulder 39 for backing up the rim flange 36. Locking ring 37 also has a lip or extension 41 that overlaps a reduced diameter portion 42 of the main rim base section and the locking ring is formed with a curved surface 43 shaped for receiving the curved bead heel portion of a tire.

In Fig. 3 both tire beads are shown carrying an air-retaining assembly 20. However, the provision of such assembly on the inner (left) tire bead is only necessary if it is wished to make the tire reversible, and if desired such bead can be formed conventionally and provided with circumferential sealing ribs as described in my Patent No. 2,587,470.

By comparing Figs. 2 and 3 it can be seen that in its molded condition lip 26 of the member 20 diverges considerably so that it falls inside of the heel and toe of the tire bead. When the tire is assembled on the rim, the outer bead and side flange 36 are pushed towards the opposite bead enough to permit the split locking ring 37 to be expanded and snapped in position on the rim base, in accordance with the usual practise. The divergence of lip 26 insures that the ribs on the lip will make a good initial seal against the rim base section 31 and thereby facilitate initial inflation, it being understood that before the rim parts are finally and firmly seated by air pressure they may be initially eccentric which has no effect on inflation when an inner tube is employed but which renders important the accommodation provided by the pre-formed divergence of lip 26 in a tubeless tire. As the tire is inflated air that seeps past the bead toe 18 presses against the exposed (radially outer) surface of lip 26 urging the lip more firmly into contact with the rim base section so that a progressive build-up of sealing forces localized by ribs 28 is provided which is always more than sufficient to resist leakage between lip 26 and the rim base that might tend to lift the lip from the rim base. These forces also urge the outer lip 24 more tightly against the tire bead thereby augmenting the sealing provided by the cemented or vulcanized joint at this area.

Since the pounding and destructive forces are exceedingly great in heavy duty truck and bus service, it is important that a sealing structure placed at the tire bead does not reduce the life of the tire. High radial loads are encountered and the part of such radial loads that in a conventional tire would be transmitted directly from the inner faces of the beads to the rim is similarly transmitted in the tire and rim assembly of this invention. This is because of provision of the load bearing portion 21 located at the tire bead heel that may engage the rim and bear radial loads. The radial load is distributed axially between the tire bead toe and the bead heel, because the load bearing portion 21 and the tire carcass are formed of relatively strong and stiff material as compared to the relatively flexible material of the sealing portion 22. I have found that as long as the load that must be borne by the bead faces is transmitted firmly at both the heel and toe areas of the bead the interruption of the load bearing engagement intermediate of such areas due to presence of the seal has no undesirable effects on the load carrying and life characteristics of the tire. It can be seen that the rim requires no modification for this service.

Another advantage of the construction is that since the rim is unmodified, a conventional tire and inner tube assembly can be employed if the tire is damaged beyond repair and a replacement tubeless tire is not readily available.

If the tire must be removed it can usually be replaced without damage to the sealing means. Should the sealing means need replacement it can be readily stripped off where non-vulcanizing cement is employed and may also be stripped off (by using more force) where a vulcanizing cement is employed. If parts of the strip adhere to the tire carcass these can be ground out of the recess with a wire brush or a coarse abrasive wheel. The reinforced bead portions of the tire carcass are relatively so strong that member 20 can be removed without damage to the tire proper.

In Fig. 4 the only difference in the rim base over that just described is that the rim base portion 31 merges with the gutter 33 without an intermediate portion of reduced diameter. Here the tire retaining means and locking means are one unit 46, which in this case must be split to pass over and then bear against the gutter lip 47. Split flange 46 has a short extension 48 intended for receiving the tire bead and is curved as at 49 corresponding to the curve 43 in the locking ring of Fig. 3. The air-retaining assembly 20 functions just as previously described in that the flexible self-sealing lip 26 makes sealing engagement with the rim base section 31 axially inwardly of the inner edge of the removable flange 46 at which zone there would otherwise be an exposed circumferential joint that would leak air from a tubeless tire.

Fig. 5 shows a modified form of a tire bead construction embodying the invention wherein both inner and outer wire bead cores 11 and 13 are of somewhat larger diameter than those of a conventional tire designed for a given rim size. Here the inner periphery of the carcass bead is cylindrical and the combined sealing and load-bearing member 20a comprises three portions: the heel load-bearing portion 21, a modified intermediate sealing portion 22a and a toe load-bearing portion 50. In the preferred construction, load-bearing portions 21 and 50 are formed of relatively stiff rubber compounded as described previously. The sealing portion 22a differs from that previously described only in that instead of having a short outer lip the corresponding portion is prolonged as at 51 and merges with the load-bearing portion 50 at the tire toe. In its free condition the lip 26 diverges as before and provides a channel 52 that is open to receive air under pressure that might leak past the bead toe, thereby firmly pressing lip 26 into sealing engagement with the rim, as before.

Instead of employing homogenous stiff rubber as the load-bearing portion or portions a construction like that shown in Fig. 7 may be employed wherein the sealing member 20b has a load-bearing portion 21b having a core made up of circumferentially wound tensile members 53 such as the rubberized cords normally employed in tire carcass ply constructions, or the members may be formed of wire. All the rubber parts in this design can be of stock like that employed for the sealing portion 22.

The sealing and air-retaining member 20c shown in Fig. 6 is mounted like that of Figs. 1-4 but the construction differs in that here the member 20c has its load-bearing portion 21c molded of the same composition as that employed for the sealing portion 22 but surrounded or clad by a metal channel 56 which tends to confine the rubber stock and stiffen it up sufficiently to provide adequate load-bearing capacity without damage due to chafing.

It will be apparent that the double load supporting form of Fig. 5 may have the load-bearing portions 21 and 50 thereof formed either of wound cords or wires, or may be armor-clad as in Fig. 6.

Having completed the detailed description of a preferred embodiment of my invention in order that those skilled in the art may practise the same, I claim:

1. A pneumatic tire and rim assembly comprising a circumferentially divided rim, said rim including a base section carrying a tire-retaining flange at one side thereof, a gutter portion including a retaining lip formed at the other side of said base section, detachable tire-retaining means including a ring-like tire-retaining flange and means engaging said gutter lip to restrain said flange against axially outward motion; a tire mounted on said rim including a carcass having reinforced beads and an air-retaining inner liner, one tire bead at said detachable tire-retaining means bridging the circumferential joint between the rim base section and the axially inner edge of said tire-retaining means; air-retaining means disposed radially between said one tire bead and the rim, said air-retaining means comprising an annular radial-load-bearing portion disposed adjacent the heel of the tire bead and engaging said tire-retaining means radially inwardly of the bead heel, and a flexible sealing portion of rubber material having radially spaced generally axially extending lips extending toward the toe of the tire bead, the radially inner of said lips being pressed pneumatically into sealing engagement with said rim base section axially inwardly of said axially inner edge of said tire-retaining means, the radially outer lip being in sealing engagement with said tire bead.

2. A pneumatic tire and rim assembly comprising a circumferentially divided rim, said rim including a base section carrying a tire-retaining flange at one side thereof, a gutter portion including a retaining lip formed at the other side of said base section, detachable tire-retaining means including a ring-like tire-retaining flange and means engaging said gutter lip to restrain said flange against axially outward motion; a tire mounted on said rim including a carcass having reinforced beads and an air-retaining inner liner, one tire bead at said detachable tire-retaining means bridging the circumferential joint between the rim base section and the axially inner edge of said tire-retaining means; said one bead being formed with a circumferential recess extending from the bead heel toward the bead toe, air-retaining means disposed in said bead recess and comprising an annular radial-load-bearing portion disposed adjacent the heel of the tire bead and engaging said tire-retaining means radially inwardly of the bead heel, and a flexible sealing portion of rubber material having radially spaced generally axially extending lips extending toward the toe of the tire bead, the radially inner of said lips being pressed pneumatically into sealing engagement with said rim base section axially inwardly of said axially inner edge of said tire-retaining means, the radially outer lip being in sealing engagement with said tire bead.

3. A pneumatic tire and rim assembly comprising a circumferentially divided rim, said rim including a base section carrying a tire-retaining flange at one side thereof, a gutter portion including a retaining lip formed at the other side of said base section, detachable tire-retaining means including a ring-like tire-retaining flange and means engaging said gutter lip to restrain said flange agan against axially outward motion; a tire mounted on said rim including a carcass having reinforced beads and an air-retaining inner liner, one tire bead at said detachable tire-retaining means bridging the circumferential joint between the rim base section and the axially inner edge of said tire-retaining means; air-retaining means disposed radially between said one tire bead and the rim, said air-retaining means comprising an annular radial-load-bearing portion disposed adjacent the heel of the tire bead and engaging said tire-retaining means radially inwardly of the bead heel, and a flexible sealing portion of rubber material having a flexible lip spaced radially inwardly from the overlying bead and extending axially toward the toe of the tire bead to provide an annular recess between the said lip and adjacent bead opening towards the interior of said tire so that said lip is pressed pneumatically into sealing engagement with said rim base section axially inwardly of said axially inner edge of said tire retaining means, the radially outer portion of said air-retaining means being in sealing engagement with said tire bead, said annular load bearing portion being radially stiffer than said flexible sealing portion.

4. A pneumatic tire and rim assembly comprising a circumferentially divided rim, said rim including a base section carrying a tire-retaining flange at one side thereof, a gutter portion including a retaining lip formed at the other side of said base section, detachable tire-retaining means including a ring-like tire-retaining flange and means engaging said gutter lip to restrain said flange against axially outward motion; a tire mounted on said rim including a carcass having reinforced beads and an air-retaining inner liner, one tire bead at said detachable tire-retaining means bridging the circumferential joint between the rim base section and the axially inner edge of said tire retaining means; air-retaining means disposed radially between said one tire bead and the rim, said air-retaining means comprising a flexible annular radial-load-bearing portion disposed adjacent the heel of the tire bead and engaging said tire-retaining means radially inwardly of the bead heel, and a flexible sealing portion of rubber material having a radially flexible generally axially extending lip extending toward the toe of the tire bead and radially spaced from said bead heel thereby providing an annular recess opening toward the interior of the tire so that said lip is pressed pneumatically into sealing engagement with said rim base section axially inwardly of said axially inner edge of said tire retaining means, said air-retaining means being in air-sealing engagement with said tire bead, the load-bearing portion of said air-retaining means comprising a material that is substantially stiffer than the sealing portion.

5. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having reinforced beads and an air-retaining inner liner, air-retaining means mounted on the radially inner surface of at least one tire bead, said air-retaining means comprising an annular relatively stiff load bearing portion disposed adjacent the heel of the tire bead for engaging the rim radially inwardly of the bead heel, and a relatively flexible sealing portion of rubber material having a generally axial sealing lip extending toward the toe of the said one tire bead and radially spaced from the said one bead to provide an annular recess therebetween opening toward the interior of the tire, said lip being radially flexible for pneumatic sealing engagement with the rim.

6. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having beads and an air-retaining inner liner, at least one of said beads having an annular recess formed therein and extending from the bead heel toward the bead toe, air-retaining means mounted on the radial surface of said recess, said air-retaining means comprising an annular relatively stiff load-bearing portion disposed adjacent the heel of the tire bead for engaging the rim radially inwardly of the bead heel, and a relatively flexible sealing portion of rubber material having a generally axial lip extending toward the toe of the tire bead and radially spaced from the latter to provide an axially extending recess between said lip and bead opening toward the interior of the tire, said lip being radially flexible for pneumatic sealing engagement with the rim.

7. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having reinforced beads and an air-retaining inner liner, air-retaining means mounted on the radially inner surface of at least one tire bead, said air-retaining means comprising an annular relatively stiff radial-load-bearing portion disposed adjacent the heel of the tire bead for engaging said tire-retaining means radially inwardly of the bead heel, and a relatively flexible sealing portion of rubber material having a pair of radially spaced generally axially extending lips extending toward the toe of the tire bead providing an axial recess therebetween opening toward the interior of the tire, the radially inner of said lips being formed for sealing engagement with the rim base section axially inwardly of the inner edge of the tire-retaining means when the tire is mounted on the rim, said lip being bonded to said load bearing portion.

8. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having beads and an air-retaining inner liner, an inextensible annular bead core extending circumferentially in at least one bead adjacent the toe portion of that bead, a second core of larger diameter extending circumferentially in said bead adjacent the heel portion of the bead, an annular recess formed in the bead at the heel portion of said bead, air-retaining means mounted in said recess, said air-retaining means comprising an annular relatively stiff load-bearing portion disposed adjacent the heel of the tire bead for engaging the rim radially inwardly of the bead heel, and a relatively flexible sealing portion of rubber material having a generally axial lip extending toward the toe of the tire bead and radially spaced from said bead heel, said lip being formed for sealing engagement with the rim.

9. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having reinforced beads and an air-retaining inner liner, air-retaining means mounted on the radially inner surface of at least one tire bead, said air-retaining means comprising an annular load-bearing portion formed of stiff rubber and disposed adjacent the heel of the tire bead for engaging the rim radially inwardly of the bead heel, and a sealing portion formed of relatively flexible rubber having a radially flexible sealing lip extending generally axially toward the toe of the tire bead, said lip being radially spaced from the overlying structure thereby providing an annular recess between the latter and the lip so that the lip effects pneumatic sealing engagement with the rim.

10. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having reinforced beads and an air-retaining inner liner, air-retaining means mounted on the radially inner surface of at least one tire bead, said air-retaining means comprising an annular load-bearing portion formed of cord-reinforced rubber material and disposed adjacent the heel of the tire bead for engaging the rim radially inwardly of the bead heel, and a sealing portion formed of flexible rubber having a radially flexible sealing lip extending generally axially toward the toe of the tire bead, said lip being radially spaced from the overlying structure thereby providing an annular recess between the latter and the lip so that the lip effects pneumatic sealing engagement with the rim.

11. A pneumatic tire for use on a circumferentially divided rim having a base section carrying a tire retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having reinforced beads and an air-retaining inner liner, air-retaining means mounted on the radally inner surface of at least one tire bead, said air-retaining means comprising an annular load-bearing portion formed of rubber material to which is bonded a metal shield, said load-bearing portion being disposed adjacent the heel of the tire bead for engaging the rim at the bead heel, and a sealing portion formed of flexible rubber having a radially flexible sealing lip extending generally axially toward the toe of the tire bead, said lip being radially spaced from the overlying structure thereby proving an annular recess between the latter and the lip so that the lip effects penumatic sealing engagement with the rim, said lip being bonded to said load bearing portion.

12. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having beads and an air-retaining inner liner, an annular recess formed in one of said beads and extending from the bead heel toward the bead toe, air-retaining means mounted on the radial surface of said recess, said air-retaining means comprising an annular load-bearing portion formed of stiff rubber and disposed adjacent the heel of the tire bead for engaging the rim radially inwardly of the bead heel, and a relatively flexible sealing portion of rubber material having a lip extending generally axially toward the toe of the tire bead and radially spaced from said bead, said lip being radially flexible for pneumatic sealing engagement with the rim.

13. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having beads and an air-retaining inner liner, an inextensible annular bead core extending circumferentially in at least one bead adjacent the toe portion of that bead, a second core of larger diameter extending circumferentially in said bead adjacent the heel portion of the bead, an annular recess formed in the bead at the heel portion of said bead, air-retaining means mounted in said recess, said air-retaining means comprising an annular load-bearing portion formed of stiff rubber and disposed adjacent the heel of the tire bead for engaging the rim radially inwardly of the bead heel, and a relatively flexible sealing portion of rubber having a lip extending generally axially toward the toe of the tire bead and radially spaced from said bead, said lip being formed for sealing engagement with the rim, said lip being bonded to said load-bearing portion.

14. A pneumatic tire for use on a circumferentially divided rim having a base section carrying a tire-retaining flange at one side thereof, a gutter portion including a retaining lip formed at the other side of said base section, and detachable tire-retaining means including a ring-like tire-retaining flange and means engaging said gutter lip to restrain said flange against axially outward motion; said tire including a carcass having beads and an air-retaining inner liner, a pair of axially spaced inextensible annular bead cores in said beads, air-retaining means mounted on the inner surface of at least one bead, said air-retaining means comprising an annular relatively stiff load-bearing portion disposed adjacent the heel of the tire bead for engaging the rim radially inwardly of the bead heel, an intermediate relatively flexible sealing portion of rubber material bonded to said load-bearing portion and having a lip extending generally axially toward the toe of the tire bead from said first named portion, said lip having a portion thereof radially spaced from said bead and formed for sealing engagement with the rim, and a second annular relatively stiff load-bearing portion bonded to said intermediate portion and disposed adjacent the bead toe for engaging the rim.

References Cited in the file of this patent

UNITED STATES PATENTS

| 1,640,844 | Main | Aug. 30, 1927 |
| 1,822,320 | Shoemaker | Sept. 8, 1931 |
| 2,563,748 | Riggs | Aug. 7, 1951 |

FOREIGN PATENTS

| 122,731 | Australia | July 22, 1944 |
| 691,981 | Great Britain | May 27, 1953 |

U. S. DEPARTMENT OF COMMERCE
PATENT OFFICE
CERTIFICATE OF CORRECTION

Patent No. 2,822,017                                              February 4, 1958

Frank Herzegh

It is hereby certified that error appears in the printed specification of the above numbered patent requiring correction and that the said Letters Patent should read as corrected below.

Column 6, lines 62 and 63, for "flange agan against" read -- flange against --; column 9, line 25, for "radally" read -- radially --; line 34, for "proving" read -- providing --.

Signed and sealed this 8th day of April 1958.

(SEAL)

Attest:

KARL H. AXLINE

Attesting Officer

ROBERT C. WATSON
Commissioner of Patents